US010699795B1

(12) United States Patent
Card et al.

(10) Patent No.: US 10,699,795 B1
(45) Date of Patent: Jun. 30, 2020

(54) SYSTEM, METHOD AND COMPUTER-ACCESSIBLE MEDIUM FOR AUTOMATED IDENTIFICATION OF EMBEDDED PHYSICAL MEMORIES USING SHARED TEST BUS ACCESS IN INTELLECTUAL PROPERTY CORES

(71) Applicant: Cadence Design Systems, Inc., San Jose, CA (US)

(72) Inventors: Norman Card, Vestal, NY (US); Steven Lee Gregor, Oswego, NY (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 58 days.

(21) Appl. No.: 16/020,083

(22) Filed: Jun. 27, 2018

(51) Int. Cl.
| G11C 29/00 | (2006.01) |
| G11C 29/12 | (2006.01) |
| G11C 29/38 | (2006.01) |
| G11C 29/18 | (2006.01) |
| G06F 30/327 | (2020.01) |
| G11C 29/04 | (2006.01) |

(52) U.S. Cl.
CPC ...... G11C 29/12015 (2013.01); G06F 30/327 (2020.01); G11C 29/18 (2013.01); G11C 29/38 (2013.01); *G11C 2029/0401* (2013.01)

(58) Field of Classification Search
CPC ... G11C 29/12015; G11C 29/38; G11C 29/18; G11C 2029/0401; G06F 17/505
See application file for complete search history.

(56) References Cited

U.S. PATENT DOCUMENTS

2004/0117744 A1* 6/2004 Nation ............... G06F 17/5045
716/104

* cited by examiner

*Primary Examiner* — Samir W Rizk
(74) *Attorney, Agent, or Firm* — Tarolli, Sundheim, Covell & Tummino LLP

(57) ABSTRACT

A method for identifying a physical memory(ies) associated with a logical memory(ies) in a memory design can include (a) receiving a generic netlist for the memory design, (b) generating a test mode for the memory using the generic netlist, (c) determining the logical memory(ies); (d) performing a simulation on the test mode for the logical memory(ies); and (e) identifying the physical memory(ies) by tracing chip selects for the physical memory(ies) to the logical memory(ies). The identifying the physical memory (ies) may further include identifying which chip selects are active. The identifying the physical memory(ies) can further include tracing an address and a data pin(s) for the logical memory(ies) in the simulation. The identifying the physical memory(ies) can further include determining an address and a data pin(s) for the logical memory(ies) in the simulation.

21 Claims, 12 Drawing Sheets

SYSTEM, METHOD AND COMPUTER-ACCESSIBLE MEDIUM FOR AUTOMATED IDENTIFICATION OF EMBEDDED PHYSICAL MEMORIES USING SHARED TEST BUS ACCESS IN INTELLECTUAL PROPERTY CORES

TECHNICAL FIELD

The present disclosure relates generally to intellectual property ("IP") cores, and more specifically, to an exemplary system, method, and computer-accessible medium for automated identification of embedded physical memories using shared test bus access in intellectual property cores.

BACKGROUND

As more and more functionality is getting integrated into system-on-chip ("SoC") designs, there is a steady increase in the usage of $3^{rd}$ party IP (e.g., Arm IP). Arm IP with memories generally has one or more Arm MBIST interfaces. The MBIST interface allows access to each memory through a sensitized functional path. This methodology moves the MBIST multiplexer away from the memory interfaces, which are often critical paths, reduces routing around each of the memories, as the functional path into the memory is reused, and allows an at-speed test from a functional register to the memory bit-cell during MBIST. These IPs contain one or more MBIST interfaces that internally consist of multiple logical arrays (e.g., memories). Each logical array (see e.g., FIG. 1) itself consists of one or more physical memories (see e.g., FIGS. 2-4), or slices of physical memories. The choice of physical memory organization for a given logical array is made by end customers based on design implementation targets and memory compilers.

Arm IP deliver MBIST information files ("MBIFs") with each IP which contains one or more MBIST interfaces. MBIF contains an electronic description of each unique Arm MBIST interface.

IP is configured during design implementation by the end customer. Organization of random access memories ("RAMs") for any given logical memory is also an end customer choice and could be done in more than one way during design implementation of the IP. The information provided in the MBIF describes only the logical arrays. The information for the connections from the logical arrays to the physical arrays must be created during implementation as there is more than one way of making physical RAM choices for a given logical array by an end customer. The MBIST insertion process requires additional information on how the physical memories are organized behind logical memories to ensure high quality testing. The information of physical organization is only available with the end customer and cannot be covered in the MBIST information file. This makes it very critical to have a technique to automatically determine all physical memories in the core (e.g., in order to test and validate that all physical memories are functioning properly), their association with the logical memories described in the MBIF and their associated enabling signals.

The complexity of the problem can be seen in the examples shown in FIGS. 1-4. FIG. 1 shows a logical memory (e.g., consisting of 94 words where each word is 100-bits wide). FIGS. 2-4 are possible implementations of the same logical memory where FIGS. 2 and 3 implement the logical memory using 3 physical memories of varied sizes while FIG. 4 implements the same logical memory using 6 physical memories. These memories are accessible via the IP boundary through an MBIST specific macro interface. Moreover, each macro interface may consist of multiple logical memories.

Each logical memory is accessed with different decode values of some array select signals. There may be varying number of pipeline stages from the test interface boundary to these logical memories. As it can be seen that a single logical memory may be constructed from a varying number of complex physical memory configurations, the problem then becomes magnified by the added complexity of multiple logical memories accessed through the same interface.

FIG. 5 shows a simplistic version of a core 500 with just single MBIST interface which contains 4 logical arrays 505 where each logical array contains 2 physical memories 510. The cores may have multiple interfaces. These physical memories may be tested from a macro interface boundary. Given the name of the macro interface, it is not at all easy to figure out all the underlying physical memories and their enabling signals because the same core may be configured in different fashion by different users of the core. And if this cannot be done properly or accurately then the memories cannot be tested which impacts quality and leads to field returns.

Thus, it may be beneficial to provide an exemplary system, method, and computer-accessible medium for automated identification of embedded physical memories using shared test bus access in intellectual property cores, which may overcome at least some of the deficiencies presented herein above.

SUMMARY

A method for identifying a physical memory(ies) associated with a logical memory(ies) in a memory design can include (a) receiving a generic netlist for the memory design, (b) generating a test mode for the memory using the generic netlist, (c) determining the logical memory(ies); (d) performing a simulation on the test mode for the logical memory(ies); and (e) identifying the physical memory(ies) by tracing chip selects for the physical memory(ies) to the logical memory(ies). The identifying the physical memory(ies) may further include identifying which chip selects are active. The identifying the physical memory(ies) can further include tracing an address and a data pin(s) for the logical memory(ies) in the simulation. The identifying the physical memory(ies) can further include determining an address and a data pin(s) for the logical memory(ies) in the simulation.

In some exemplary embodiments of the present disclosure, the generating of the test mode can include pulsing a plurality of clocks and setting static control signals to a particular value. The performing of the simulation can include setting a request and a reset to particular active values and pulsing a plurality of clocks to reset a simulation interface. The performing of the simulation can further include turning the reset off, pulsing a plurality of additional clocks to initialize the interface, and capturing a memory built-in self-test acknowledge value. The physical memory(ies) can include a plurality of physical memories. A further logical memory(ies) can be included. The further physical memory(ies) associated with the further logical memory(ies) can be identified by repeating procedures (d) and (e) for the further logical memory(ies).

In certain exemplary embodiments of the present disclosure, the generic netlist can be received from a synthesis tool. The synthesis tool can be configured to receive a hardware design language file for the memory and generate the generic netlist based on the hardware design language. A model(s) of the memory design can be built based on the generic netlist, and the generating of the test mode can be based on the model(s). The tracing chip selects may be performed in a test tool. The identifying of the physical memory(ies) may include tracing a particular pin in a current state of the simulation. The tracing chip selects may include setting a plurality of trace options prior to performing the tracing.

A method for identifying a physical memory(ies) associated with a logical memory(ies) in a memory design can include (a) receiving a generic netlist for the memory design, (b) generating a test mode for the memory(ies) using the generic netlist, (c) determining the logical memory(ies), (d) performing a simulation on the test mode, and (e) identifying the physical memory(ies) by tracing chip selects for the memory(ies) to the logical memory(ies) by determining which chip selects are active, and tracing an address and at least one data pin for the logical memory(ies) in the simulation. The identifying the physical memory(ies) can further include determining an address and a data pin(s) for the logical memory(ies) in the simulation.

A method for identifying a physical memory(ies) associated with a logical memory(ies) in a memory design can include (a) receiving a hardware design language (HDL) file(s) for a memory using a synthesis tool, (b) generating a generic netlist based on the HDL file using the synthesis tool, (c) simulating the memory using a test tool, (d) determining if a memory built-in self-test acknowledge signal has a particular value using the synthesis tool, and (e) identifying the physical memory(ies) by tracing the physical memory(ies) to the logical memory(ies) using the test tool. A further physical memory(ies) associated with a further logical memory(ies) can be determined by repeating procedures (d) and (e).

These and other objects, features, and advantages of the exemplary embodiments of the present disclosure will become apparent upon reading the following detailed description of the exemplary embodiments of the present disclosure when taken in conjunction with the appended claims.

BRIEF DESCRIPTION OF THE DRAWINGS

Further objects, features, and advantages of the present disclosure will become apparent from the following detailed description taken in conjunction with the accompanying Figures showing illustrative embodiments of the present disclosure, in which.

Figure 1:
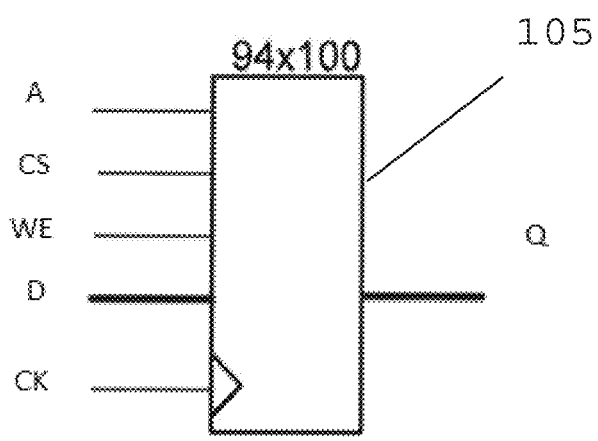
FIG. 1 is an exemplary schematic diagram of a logical memory.
Figure 2:
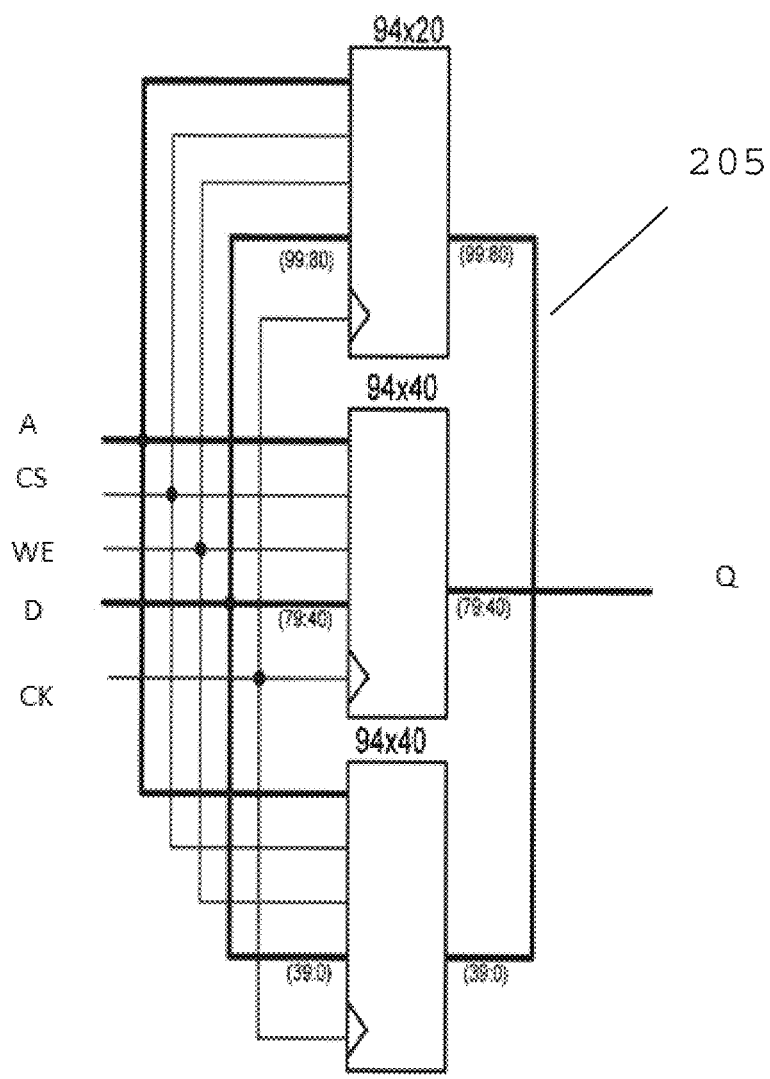
FIG. 2 is an exemplary schematic diagram of a logical memory mapped to physical memories.
Figure 3:
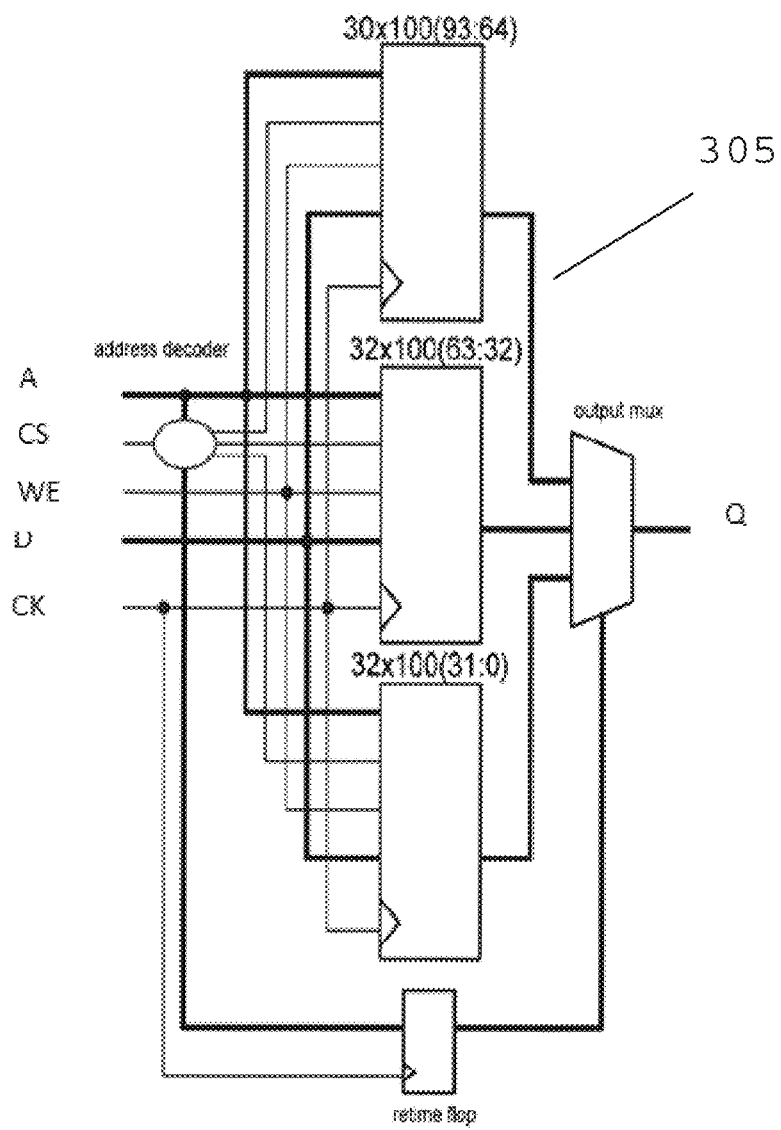
FIG. 3 is a further exemplary schematic diagram of a logical memory mapped to physical memories.
Figure 4:
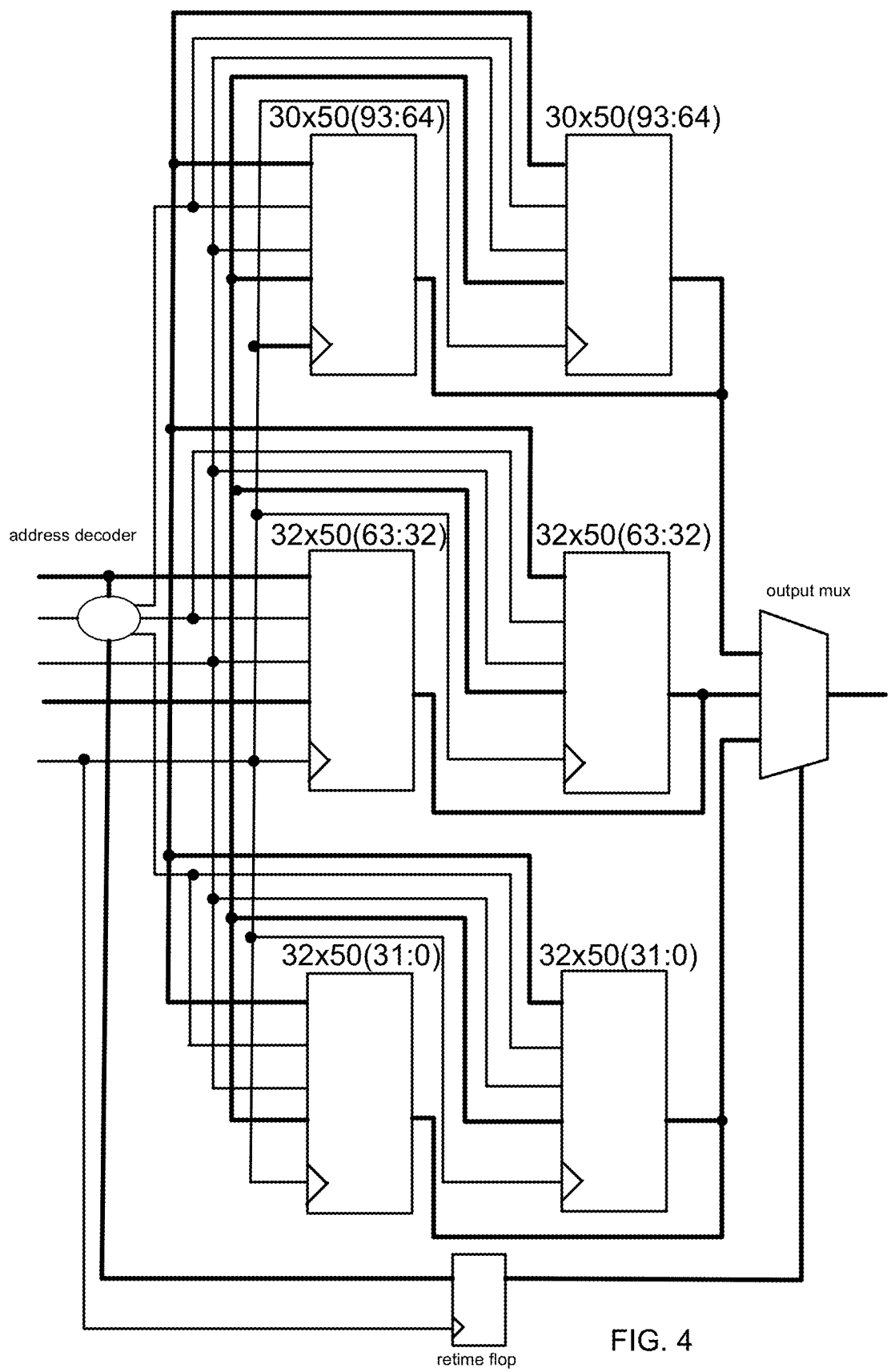
FIG. 4 is an even further exemplary schematic diagram of a logical memory mapped to physical memories.
Figure 5:
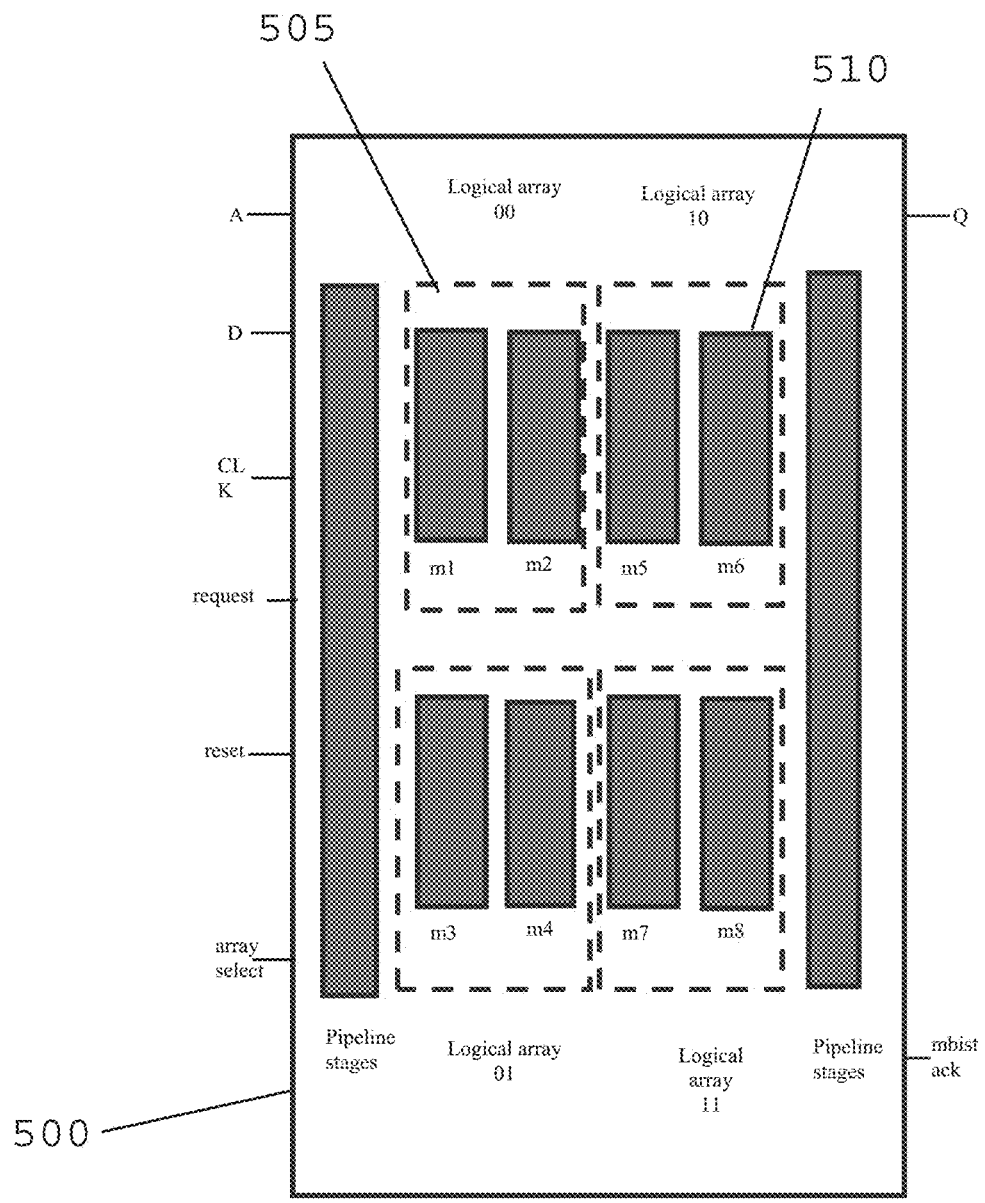
FIG. 5 is an exemplary diagram of a MBIST interface according to an exemplary embodiment of the present disclosure.

Throughout the drawings, the same reference numerals and characters, unless otherwise stated, are used to denote like features, elements, components, or portions of the illustrated embodiments. Moreover, while the present disclosure will now be described in detail with reference to the figures, it is done so in connection with the illustrative embodiments and is not limited by the particular embodiments illustrated in the figures and the appended claims.

DESCRIPTION OF EMBODIMENTS

The exemplary system, method, and computer-accessible medium, may utilize extraction of embedded shared Memory BIST bus interface specification from IP cores. In the synthesis tool (e.g., Genus), library definitions may be removed for memories, and these designs may be written out from the synthesis tool. Inside of a test tool (e.g., Modus), a model may be built based on design from the synthesis tool. Technology dependent cells may be utilized via a keyword. A testmode used for tracing that may include static control signals set to a particular value.

The exemplary system, method, and computer-accessible medium, may use a test tool to trace the various parts of the logic. For example a Tcl CUI interface may be used, and the mode initialization state may be simulated. An initialization sequence may be performed using, for example, (i) MBIST request and reset active, (ii) clock pulsing, (iii) setting MBIST reset to inactive, and (iv) clock pulsing to let the MBIST interface initialize. A trace_circuit command guided by tracing options may be used to trace on specific logic values in the available two circuit states. For a given logical array decode (e.g., logical memory), active physical memories may be identified by analyzing the chip select values. Address pins on the physical memory may be traced to the interface input address, and the interface output may be traced to see connections from physical memory outputs (e.g., Q pins) to the interface output (e.g., data out).

The exemplary system, method, and computer-accessible medium, according to an exemplary embodiment of the present disclosure, may simulate an original customer, design as is (e.g., not modified or not significantly modified), and may be used. Verification of the mbist_ack signal may indicate that an MBIST interface has been initialized properly. In contrast to prior methods where two passes of propagating values and performing may have been necessary, only one pass is required in the exemplary system, method, and computer-accessible medium. The exemplary system, method, and computer-accessible medium, is also easier to debug when there are issues, and scripts may be created that are run in the test tool, which may be left available to the user for debug purposes by using the debug option.

Exemplary Static Approach

The Static approach may depend upon the state of the design. This may include converting flops to buffers (e.g., so that pipeline stages may be traced) and propagating the constant values on a set of control signals for each logical array (e.g., retrieved from the MBIF file) throughout the core.

After propagating the constants, the active physical memories may be located in this logical array based on active chip-selects. Each successfully located active physical memory may be processed one-by-one. In the same configuration, or design state with propagated constants, trace-back on address and data pins of the active physical memories may be performed until the MBIST interface on the core boundary may be reached. Similarly, the trace-back may be performed on the outputs of the MBIST interface on the core until the active physical memory boundary may be reached. Thus, all the active physical memories (e.g., present inside a logical array) and their associated control/enabling signals may be found.

Figure 6:
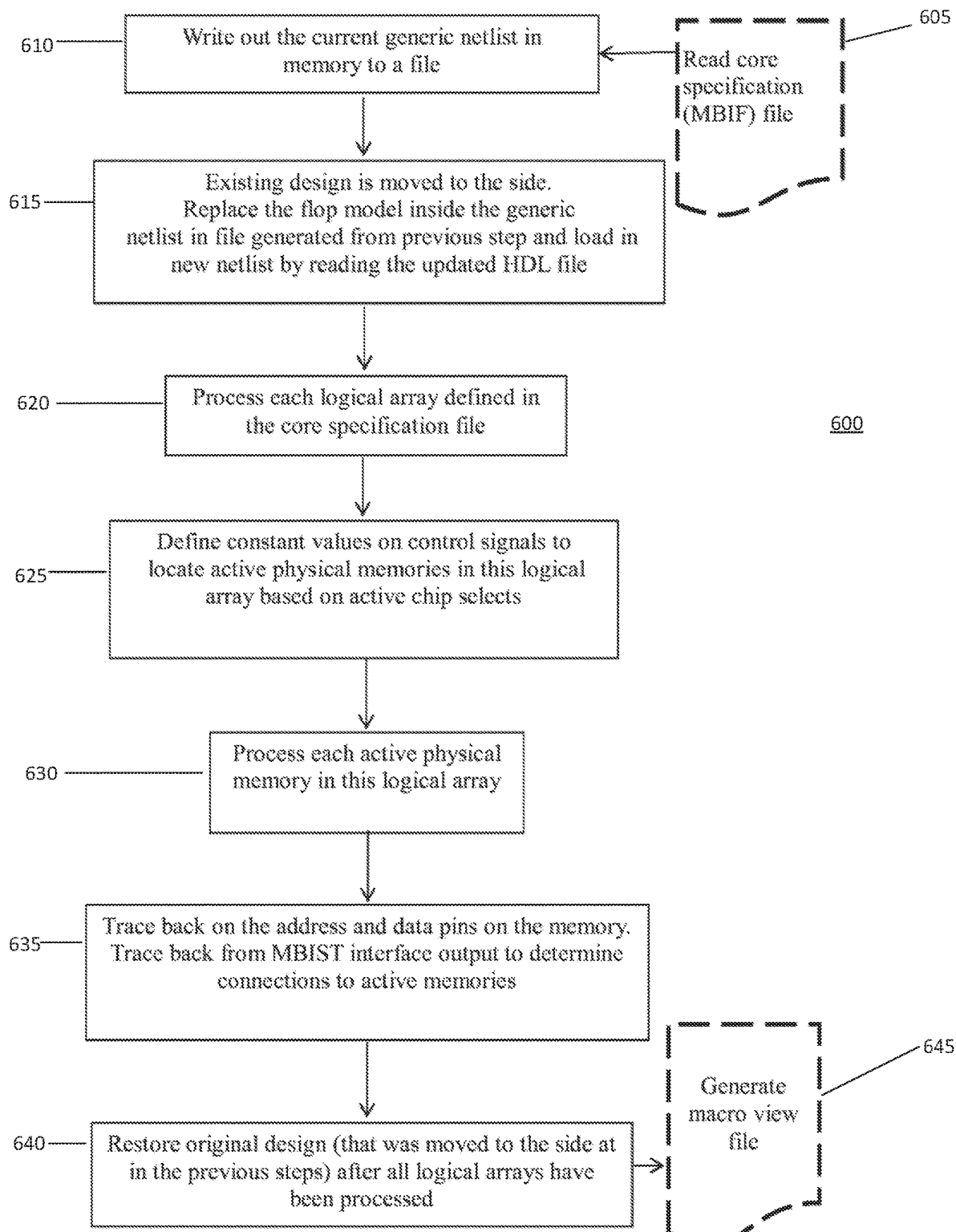
FIG. 6 is an exemplary flow diagram of a method for generating a macro view file according to an exemplary embodiment of the present disclosure.

The exemplary system, method, and computer-accessible medium, may be performed entirely in a synthesis tool. FIG. 6 shows an exemplary flow diagram of a method 600 for generating a macro view file, which is performed in a synthesis tool, according to an exemplary embodiment of the present disclosure. For exemplary, at procedure 605, a core specification MBIF file can be read. The current generic netlist can be written out in memory to a file at procedure 610. At procedure 615, the existing design may be moved to the side and the flip flop model inside the generic netlist may be replaced from procedure 615, and a new netlist may be loaded by reading an updated hardware design language ("HDL") file. At procedure 620, each logical array defined in the core specification file may be processed, and constant values on the control signals may be defined to locate the active physical memories in this logical array based on active chip sets at procedure 625.

At procedure 630, each active physical memory can be processed in the logical array. The address and data pins on the memory can be traced back, as well as the MBIST interface to the output to determine connections to active memories at procedure 635. At procedure 640, the original design that has previously moved to the side can be restored after all logical arrays have been processed. The macro view file can then be generated at procedure 645. The generated macro view file may have details of all the physical memories present inside different logical memories for each MBIST interface of the given core. This file also has the information about the enabling signals for each physical memory, mapping of their data/address buses onto the MBIST interface buses etc. so that each physical memory can be tested properly.

Although the static approach may handle a lot of cores, there may be cases when sensitization of the MBIST path may be a function of the reset state or the initialized state of the functional logic after applying the MBIST initialization sequence.

Exemplary Dynamic Approach

Figure 7:
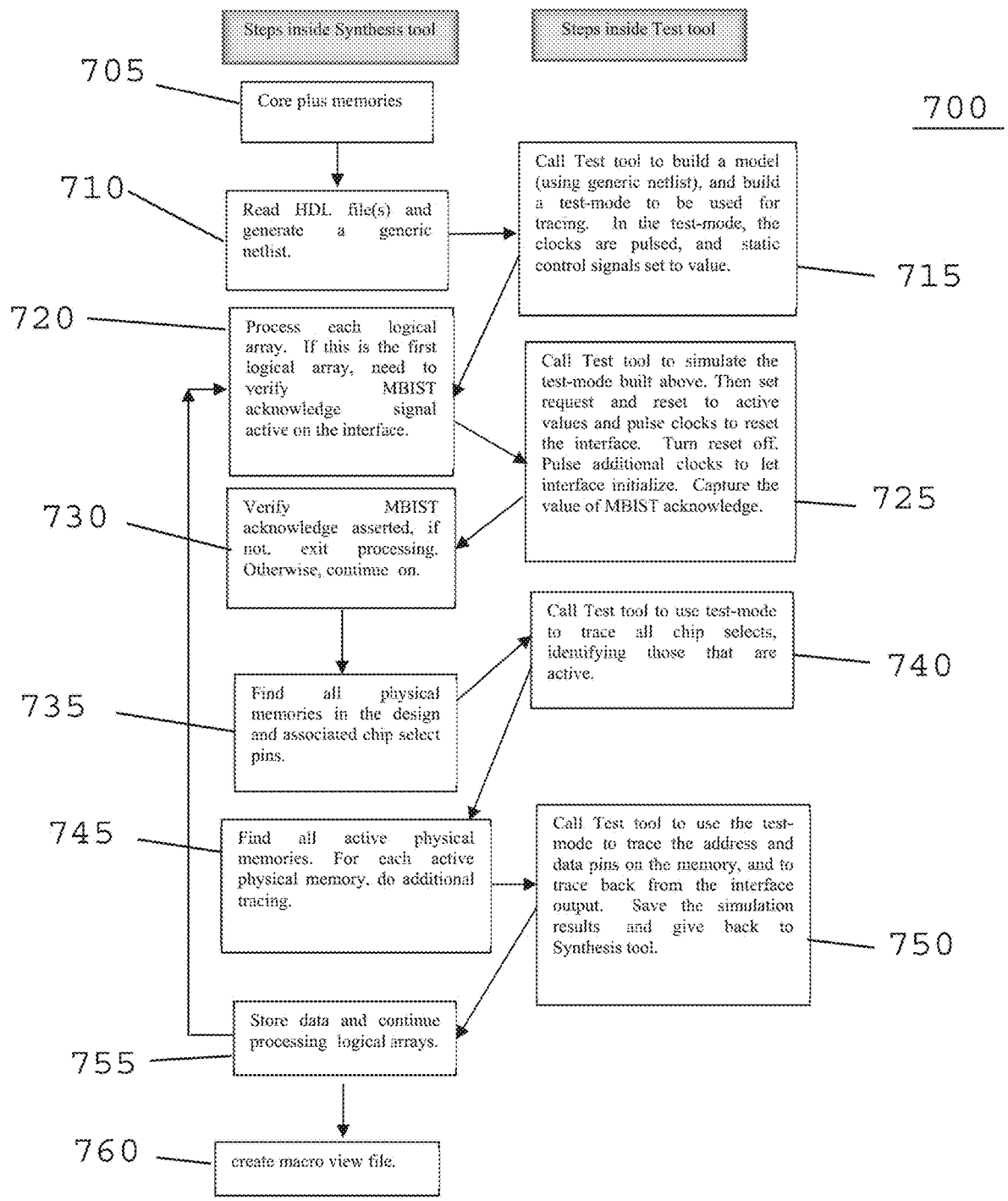
FIG. 7 is an exemplary flow diagram of a method for creating a macro view file according to an exemplary embodiment of the present disclosure.

The dynamic approach may utilize a simulation to propagate the needed initialization sequence through the core design. This utilizes activation of the MBIST request/reset signals, pulsing the clock, deactivating MBIST reset and then pulsing the clock to initialize the MBIST interface. This analysis may be performed using the combination of synthesis and test tools. FIG. 7 shows a further flow diagram of a method 700 for creating a macro view file according to an exemplary embodiment of the present disclosure. For example, at procedure 705, core plus memories can be input, and the HDL files and generic netlist may be read at procedure 710. At procedure 715 a test tool may be called to build a model (e.g., using generic netlist), and a testmode may be built to be used for tracing. In the testmode, the clocks may be pulsed, and static control signals set to a particular value. At procedure 720, each logical array may be processed. If this is the first logical array, the MBIST acknowledge signal may be verified as active on the interface. At procedure 725, the testmode may be called on the test tool to perform a simulation. The values and pulse clocks may set request and reset to active to reset the interface. Reset may be turned off, and additional clocks may be pulsed to let interface initialize. The value of MBIST acknowledge may then be captured, which can ensure that the hardware is functioning properly in the simulation.

At procedure 730, MBIST acknowledge asserted may be verified, and if not, the processing may exited. At procedure 735, all physical memories in the design and associated chip select pins may be located. At procedure 740, the Test tool may be called to use testmode to trace all chip selects, identifying those that are active. At procedure 745, all active physical memories may be located. For each active physical memory, additional tracing may be performed. At procedure 750, the Test tool may be called to use the testmode to trace the address and data pins on the memory, and to trace back from the interface output. The simulation results may be saved and provided back to Synthesis tool. At procedure 755, the data may be stored, and logical arrays may be continued to be processed. The data stored at procedure 755 may be used to process a further logical at procedure 720. At procedure 760, a macro view file may be created.

Figure 8:
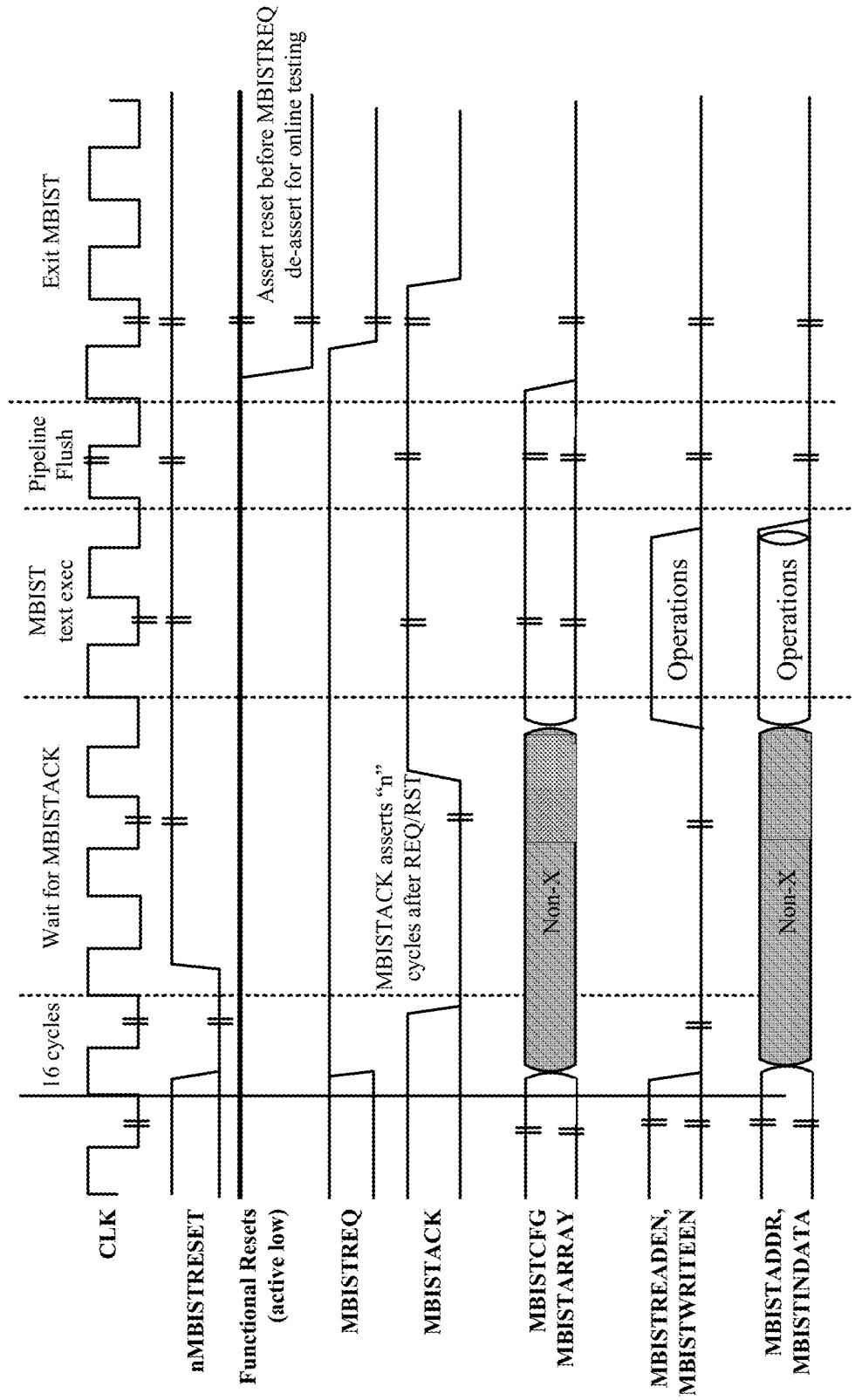
FIG. 8 is an exemplary MBIST sequence initialization diagram for MBIST entry and exit for ARM intellectual property according to an exemplary embodiment of the present disclosure.

To map the logical arrays to physical memories along with their enabling signals, a synthesis tool may be used. This may include setting the design in a particular state by propagating constant values on a set of signals (e.g., throughout the core). These signals, along with their active values, may be picked from the MBIF file. This may be used helped to identify physical memories along with their enabling signals in a set of Arm IP, or other non-ARM IP. As discussed above, this may have limited performance across all Arm cores. In contrast, the exemplary system, method, and computer-accessible medium, may utilize MBIST path sensitization, which may be implemented differently across IPs based on performance and power requirements. All Arm IP have a requirement that an MBIST initialization sequence occur. (See e.g., MBIST initialization diagram 805 shown in FIG. 8). During this initialization, the MBISTREQ and nMBISTRESET signals may be enabled to initialize the MBIST interface. Then at some period later, the Arm IP may output the MBISTACK signal telling the user that the MBIST interface may be ready to be used. This may vary across different Arm IP for various reasons. For many IP, once the nMBISTRESET may be disabled, the MBIST interface may be ready to use. For some IP, the MBIST interface may successfully be traced with the static method. The remaining IP may benefit from the clock being pulsed for a given number of cycles after propagating a set of constants in the design to enable MBISTACK.

In order to address some of the deficiencies presented above, a further exemplary system, method, and computer-accessible medium, according to an exemplary embodiment of the present disclosure, can be used for all possible variations of Arm IP, which may utilize both synthesis and test tools. The test tool has the capabilities to simulate the design which may be needed because the physical memories inside these cores may be accessed only after propagating an initialization sequence through the design. This utilizes propagating a set of constants, setting the request and reset signals, pulsing the clock to reset and initialize the interface, and then waiting for the acknowledge signal to go active.

Only after simulating and bringing the design in such a state, physical memories may be identified along with their enabling signals. As shown in Table 1 below, all the cores were handled cleanly and correctly without any issues.

The MBIF specific information may be converted to a particular format, which may be referred to as a macro view. (See pseudo code described below).

```
{
macro {
<macro_interface_subdesign_name>
}
{
name<intf>
//The following pins remain at constant value during
//the course of memory testing
    port_action {
    ../../pin1 0
    ../../pin2 0
    ../../pin3 0
    ../../pin4 1
    ../../pin5 1
    }
    memory_map {
        //the enabling signal for this logical memory
        target_map {
            <mbist_array[x:0]>{00001}
        }
        read_delay<pipe_depth>+<setup>+<read_cycle>+1
        request_latency<setup>+<read_cycle>
        //information of each physical memory inside this
        //logical memory
        segment {
//physical memory module name
        memory_module<name>
        //instance of the physical memory
        instances {
        ../../../<path1>/<path2>/<meminst>
        }
        //physical memory information mapping to the
        //interface boundary
            port_alias {
            a.1<mbist_addr[x-n:0]>
            re.1<mbist_read_enable>
            q.1<mbist_data_out[z:0]>
            d.1<mbist_data_in[z:0]>
            we.1<mbist_write_enable>
            }
        }
    }
}
}
```

The static method may not be successful on all cores but only utilizes only the synthesis tool. In contrast, the dynamic method may handle all cores, but it utilizes the intervention of the test tool along with the synthesis tool. The dynamic method also has the advantage of figuring out the clock gates which need to be controlled, and how they are controlled. This information may be passed back to the synthesis tool which may aid in insertion of MBIST logic as well.

Exemplary Results

Various experiments were performed on many Arm IP ranging in design size from 5.9M blocks to 472.6M blocks. The results of these experiments are shown in Table 1. As indicated, the static method failed to provide correct results on some of the cores (referred to as 'N') which forced the need for the dynamic method. The dynamic method succeeded in all cores (referred to as 'Y').

TABLE 1

| Core Name | MBIF* | Logical Arrays | Min PM~ | Max PM~ | Static method | Dynamic method |
|---|---|---|---|---|---|---|
| Cortex-A55 | Intf1 | 30 | 1 | 8 | Never tried | Y |
| Cortex ®-A73 | Intf1 | 252 | 1 | 16 | Y | Y |
| | Intf2 | 2 | 16 | 16 | Y | Y |
| | Intf3 | 46 | 1 | 4 | Y | Y |
| DSU ® | Intf1 | 61 | 1 | 8 | Never tried | Y |
| Cortex ®-CA53 | Intf1 | 125 | 4 | 4 | N | Y |
| | Intf2 | 4 | 1 | 12 | N | Y |
| Mali ®-DP650 | Intf1 | 23 | 1 | 1 | Y | Y |
| | Intf2 | 6 | 1 | 1 | Y | Y |
| | Intf3 | 6 | 1 | 1 | Y | Y |
| | Intf4 | 1 | 1 | 1 | Y | Y |
| | Intf5 | 11 | 1 | 1 | Y | Y |
| Mali ®-G71 | Intf1 | 20 | 1 | 1 | Y | Y |
| | Intf2 | 2 | 1 | 1 | Y | Y |
| | Intf3 | 25 | 1 | 4 | Y | Y |
| | Intf4 | 118 | 1 | 1 | Y | Y |
| Cortex ®-A75 | Intf1 | 63 | 1 | 8 | N | Y |
| Mali ®-G51 | Intf1 | 17 | 1 | 1 | Never tried | Y |
| | Intf2 | 2 | 1 | 1 | Never tried | Y |
| | Intf3 | 17 | 1 | 4 | Never tried | Y |
| | Intf4 | 70 | 1 | 4 | Never tried | Y |
| | Intf5 | 108 | 1 | 4 | Never tried | Y |

*MBIST information file
~Number of physical memories

Since every interface may contain many logical arrays, the minimum and maximum number of physical memories across the set of logical arrays in a given interface is presented in Table 1. This is done for the sake of simplicity. Also, the design size may be represented in terms of block count. This block count may be the number of blocks in the flat model of the design created by the test tool. Moreover, 'never tried' under the 'static method' column indicates that this method was never tried on that particular core/interface due to the fact that the effort was being moved to the newer dynamic approach. Due to continuously increasing complexity of the IP design, an automated method may be utilized to identify each physical memory present inside every logical array of the core and its associated enabling signals. As the physical memory may contain the actual physical layout information, proper binding of logical arrays to physical memories may be beneficial to ensure the quality of the memory test.

Manual tracing may not only be time consuming and error-prone, but also may not even be feasible (e.g., due to initialization sequence). A couple of robust and automated methods have been developed which may trace each physical memory present inside the core to its respective logic array. The quality of this mapping may be beneficial for proper insertion and operation of MBIST. If something may be mapped incorrectly, not only does it lead to wasted man-hours for debug purposes but also leads to quality issues.

Both methods described above not only reduce the effort and time to trace each physical memory manually but also may be fully automated and accurately relate the physical memories with their corresponding logical array and interface on the core design. This accurate association ensures the proper insertion of MBIST logic, quality of verification and reduced time for verification of the physical memories. This increases the probability of a fault free chip being shipped to the end-user.

A test tool may be used to trace the various parts of the logic. The mode initialization sequence, which contains the static control signals at value, may be simulated, and then the MBIST initialization sequence may be simulated (e.g., handling the MBIST request, reset and clocks). After that, read enable and write enable controls are set to the desired value, the logical array being analyzed is set, and the address pins on the interface are set to a known value. Finally, a test tool trace_circuit command is called to trace the specified pin in the current design state.

Example script:
```
Simulate mode init sequence
simulate_state test_mode_initialization
Perform MBIST initialization sequence
set_db port:sys_mbistreq_i.value 1/1
set_db port:nmbistreset.value 0/0
Pulse clock
for {set i 0} {$i<200} {incr i} {
set_db port:coreclk.value p/p
}
set_db port_nmbistreset.value 1/1
Let mbist interface initialize
for {set i 0} {$i<200} {incr i} {
set_db port:coreclk.value p/p
}
```

Figure 9A:
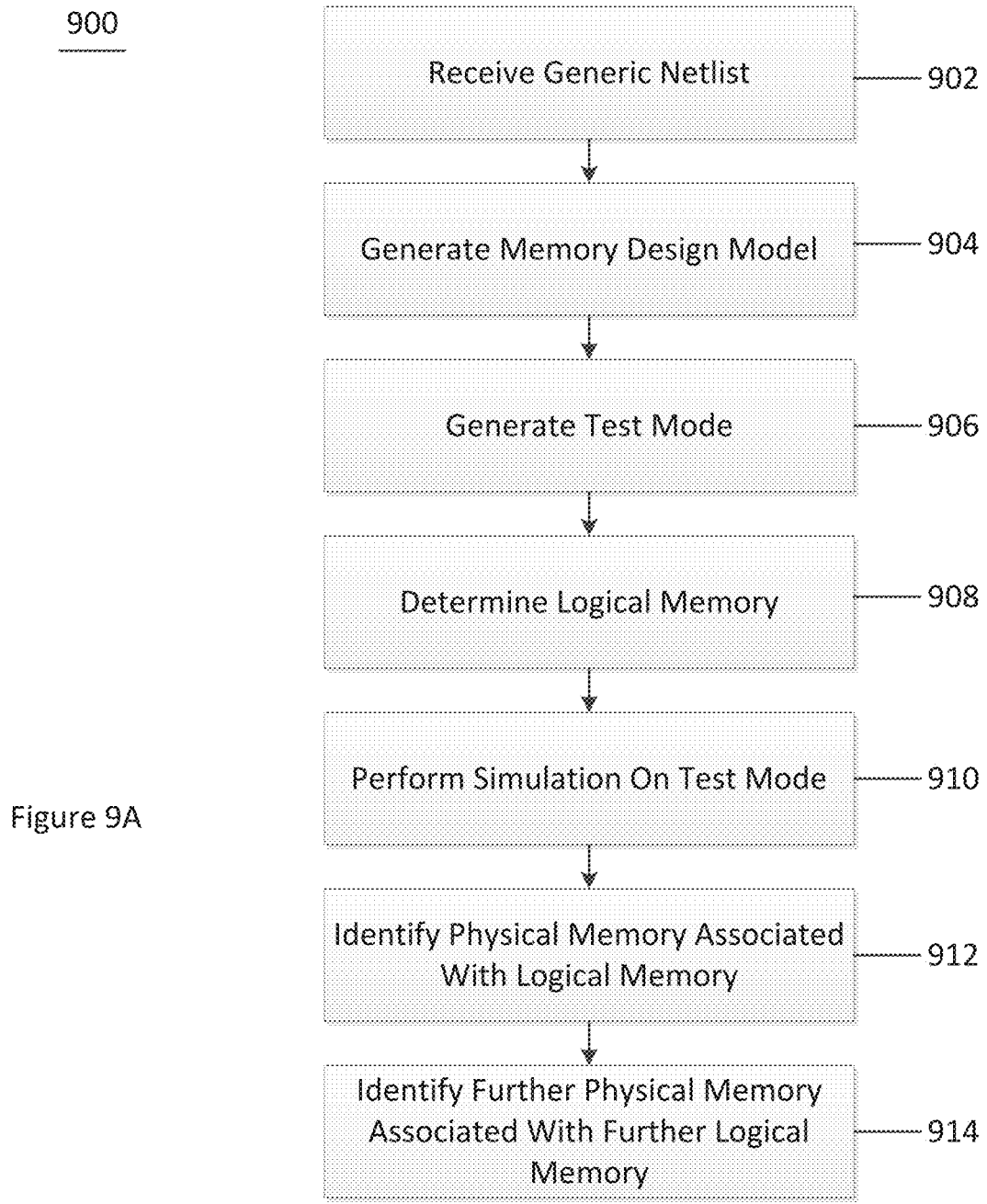
FIGS. 9A-9C are exemplary flow diagrams of methods for identifying a physical memory(ies) associated with a logical memory(ies) in a memory design according to an exemplary embodiment of the present disclosure.
Figure 9B:
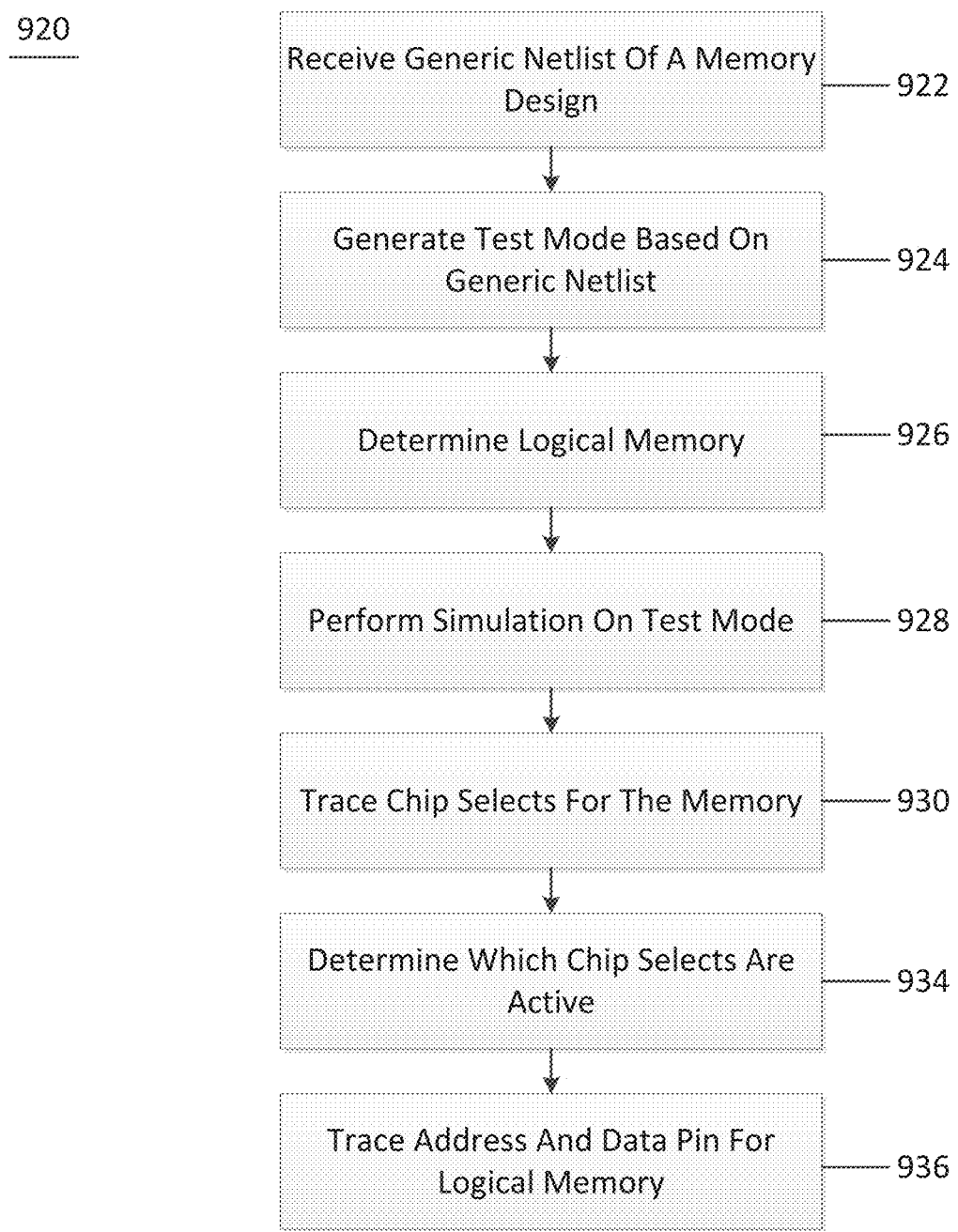
Figure 9C:
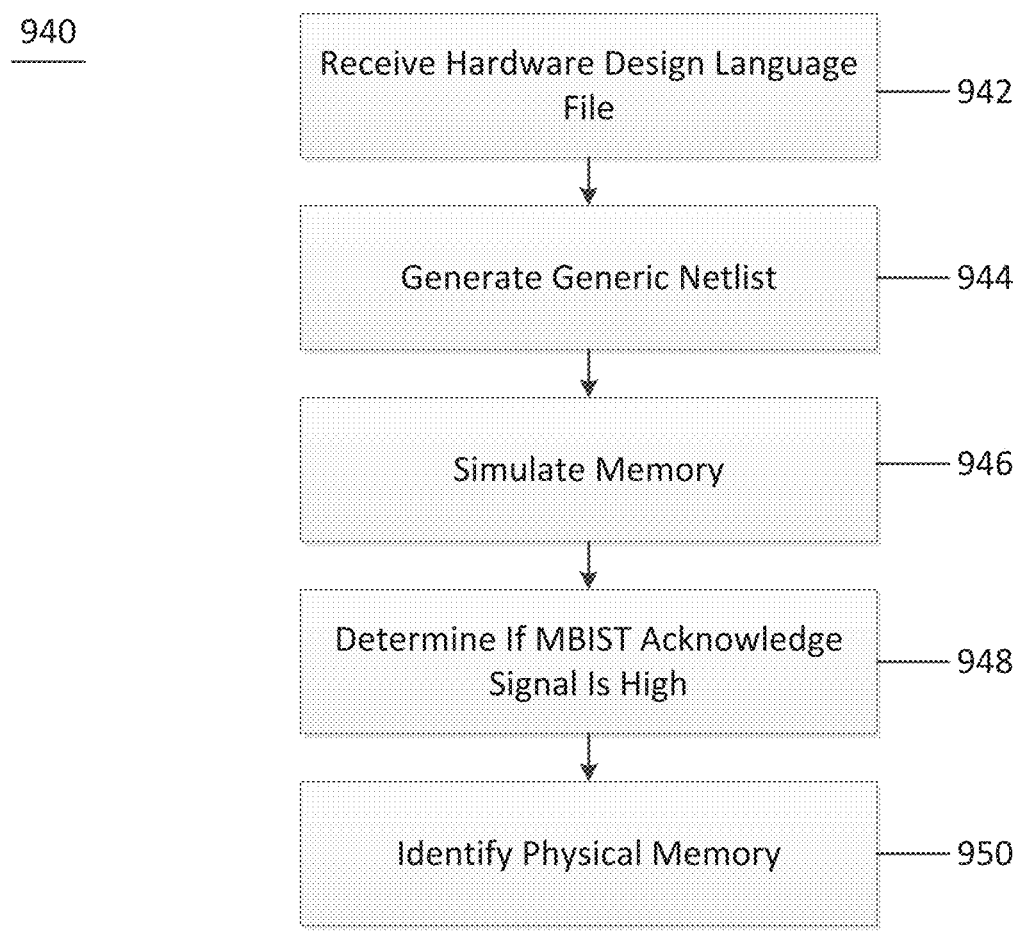

FIGS. 9A-9C are exemplary flow diagrams of methods 900, 920, and 940 for identifying a physical memory associated with a logical memory in a memory design according to an exemplary embodiment of the present disclosure. For example, in method 900, at procedure 902, a generic netlist can be received. A model of the memory design can be built at procedure 904. A test mode can be generated at procedure 906 and a logical memory can be determined at procedure 908. At procedure 910, a simulation can be performed on the test mode. At procedure 912, the physical memory associated with the logical memory can be determined. At procedure 914, a further physical memory associated with a further logical memory can be determined.

In method 920, at procedure 922, a generic netlist of a memory design can be received. A test mode based on the generic netlist can be received at procedure 924. At procedure 926, a logical memory can be determined. At procedure 928, a simulation can be performed on the test mode. At procedure 930, chip selects for the memory can be traced, and the active chip selects can be determined at procedure 934. At procedure 936, the address and the data pin(s) for the logical memory can be traced.

In method 940, at procedure 942, a hardware design language file can be received, which can be used to generate a generic netlist at procedure 944. At procedure 946, the memory can be simulated. At procedure 948, a determination can be made as to whether a memory built-in self-test acknowledge signal is high or is of a particular value. At procedure 950, a physical memory associated with a logical memory can be identified.

Figure 10:
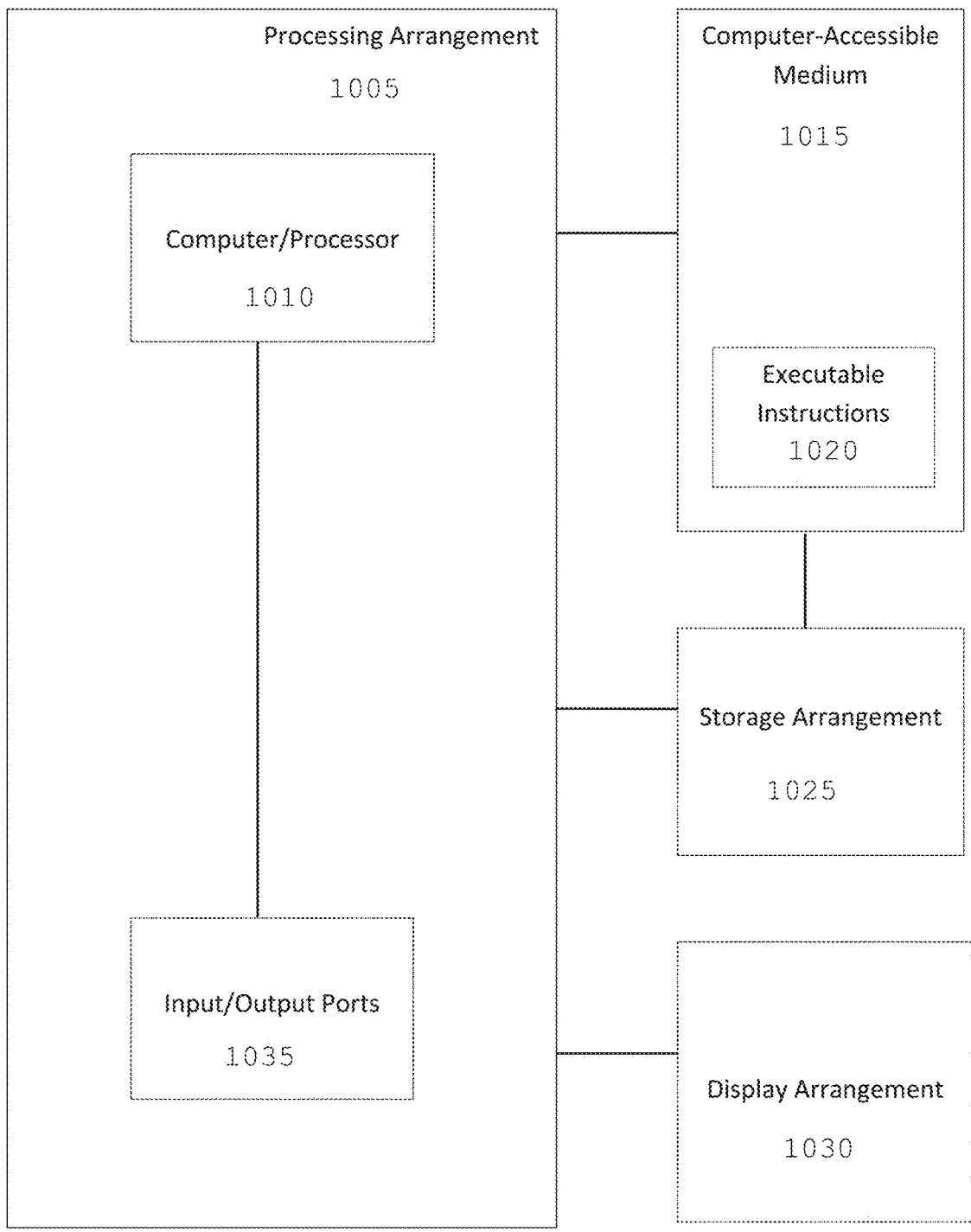
FIG. 10 is an illustration of an exemplary block diagram of an exemplary system in accordance with certain exemplary embodiments of the present disclosure.

FIG. 10 shows a block diagram of an exemplary embodiment of a system according to the present disclosure. For example, exemplary procedures in accordance with the present disclosure described herein may be performed by a processing arrangement and/or a computing arrangement 1005. Such processing/computing arrangement 1005 may be, for example entirely, or a part of, or include, but not be limited to, a computer/processor 1010 that may include, for example, one or more microprocessors and use instructions stored on a computer-accessible medium (e.g., RAM, ROM, hard drive, or other storage device).

As shown in FIG. 10, for example, a computer-accessible medium 1015 (e.g., as described herein above, a storage device such as a hard disk, floppy disk, memory stick, CD-ROM, RAM, ROM, etc., or a collection thereof) may be provided (e.g., in communication with the processing arrangement 1005). The computer-accessible medium 1015 may contain executable instructions 1020 thereon. In addition or alternatively, a storage arrangement 1025 may be provided separately from the computer-accessible medium 1015, which may provide the instructions to the processing arrangement 1005 so as to configure the processing arrangement to execute certain exemplary procedures, processes, and methods, as described herein above, for example.

Further, the exemplary processing arrangement 1005 may be provided with or include an input/output arrangement port 1035, which may include, for example, a wired network, a wireless network, the internet, an intranet, a data collection probe, a sensor, etc. As shown in FIG. 10, the exemplary processing arrangement 1005 may be in communication with an exemplary display arrangement 1030, which, according to certain exemplary embodiments of the present disclosure, may be a touch-screen configured for inputting information to the processing arrangement in addition to outputting information from the processing arrangement, for example. Further, the exemplary display 1030 and/or a storage arrangement 1025 may be used to display and/or store data in a user-accessible format and/or user-readable format.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and may be thus within the spirit and scope of the disclosure. Various different exemplary embodiments may be used together with one another, as well as interchangeably therewith, as should be understood by those having ordinary skill in the art. In addition, certain terms used in the present disclosure, including the specification, drawings and claims thereof, may be used synonymously in certain instances, including, but not limited to, for example, data and information. It should be understood that, while these words, and/or other words that may be synonymous to one another, may be used synonymously herein, that there may be instances when such words may be intended to not be used synonymously. Further, to the extent that the prior art knowledge has not been explicitly incorporated by reference herein above, it is explicitly incorporated herein in its entirety. All publications referenced are incorporated herein by reference in their entireties.

The invention claimed is:

1. A method for identifying at least one physical memory associated with at least one logical memory of a plurality of logical memories in a memory design, comprising:
   (a) receiving a generic netlist for the memory design;
   (b) generating a test mode for the memory design using the generic netlist, wherein the test mode includes setting a set of static control signals to a particular value to locate each active physical memory in the at least one logical memory;
   (c) determining the at least one logical memory by processing each logical memory of the plurality of logical memories in the memory design;

(d) performing a simulation on the test mode for the at least one logical memory, wherein the set of static control signals of a particular value are propagated throughout the memory design; and (e) identifying the at least one physical memory by tracing chip selects for the at least one physical memory to the at least one logical memory.

2. The method of claim 1, wherein the identifying the at least one physical memory further includes identifying which chip selects are active.

3. The method of claim 1, wherein the identifying the at least one physical memory further includes tracing an address and at least one data pin for the at least one logical memory in the simulation.

4. The method of claim 1, wherein the identifying the at least one physical memory further includes determining an address and at least one data pin for the at least one logical memory in the simulation.

5. The method of claim 1, wherein the generating of the test mode includes pulsing a plurality of clocks.

6. The method of claim 1, wherein the performing of the simulation includes:
setting a request and a reset to particular active values; and
pulsing a plurality of clocks to reset a simulation interface.

7. The method of claim 6, wherein the performing of the simulation further includes:
turning the reset off;
pulsing a plurality of additional clocks to initialize the interface; and
capturing a memory built-in self-test acknowledge value.

8. The method of claim 1, wherein the at least one physical memory includes a plurality of physical memories.

9. The method of claim 8, further comprising at least one further logical memory.

10. The method of claim 9, further comprising identifying at least one further physical memory associated with the at least one further logical memory by repeating procedures (d) and (e) for the at least one further logical memory.

11. The method of claim 10, further generating a macro view file that has details of each physical memory identified in the memory design.

12. The method of claim 1, wherein the generic netlist is received from a synthesis tool.

13. The method of claim 12, wherein the synthesis tool is configured to:
receive a hardware design language file for the memory; and
generate the generic netlist based on the hardware design language.

14. The method of claim 1, further comprising building at least one model of the memory design based on the generic netlist, wherein the generating of the test mode is based on the at least one model.

15. The method of claim 1, wherein the tracing chip selects is performed in a test tool.

16. The method of claim 1, wherein identifying the at least one physical memory includes tracing a particular pin in a current state of the simulation.

17. The method of claim 1, wherein the tracing chip selects includes setting a plurality of trace options prior to performing the tracing.

18. A method for identifying at least one physical memory associated with at least one logical memory of a plurality of logical memories in a memory design, comprising:

(a) receiving a generic netlist for the memory design;

(b) generating a test mode for the at least one memory design using the generic netlist, wherein the test mode includes setting a set of static control signals to a particular value to locate each active physical memory in the at least one logical memory;

(c) determining the at least one logical memory by processing each logical memory of the plurality of logical memories in the memory design;

(d) performing a simulation on the test mode for the at least one logical memory, wherein the set of static control signals of a particular value are propagated throughout the memory design; and (e) identifying the at least one physical memory by:
tracing chip selects for the at least one memory to the at least one logical memory by determining which chip selects are active, and
tracing an address and at least one data pin for the at least one logical memory in the simulation.

19. The method of claim 18, wherein the identifying the at least one physical memory further includes determining an address and at least one data pin for the at least one logical memory in the simulation.

20. A method for identifying at least one physical memory associated with at least one logical memory of a plurality of logical memories in a memory design, comprising:

(a) receiving at least one hardware design language (HDL) file for a memory design using a synthesis tool;

(b) generating a generic netlist based on the HDL file using the synthesis tool wherein the netlist is used to generate a test mode which includes setting static control signals to a particular value;

(c) simulating the memory design using a test tool by processing each logical memory of the plurality of logical memories in the memory design;

(d) determining if a memory built-in self-test acknowledge signal has a particular value using the synthesis tool by propagating the set of static controls signals of a particular value throughout the memory design; and (e) identifying the at least one physical memory by tracing the at least one physical memory to the at least one logical memory using the test tool.

21. The method of claim 20, further comprising determining at least one further physical memory associated with at least one further logical memory by repeating procedures (d) and (e).

* * * * *